Patented Feb. 5, 1952

2,584,756

UNITED STATES PATENT OFFICE 2,584,756

CATALYSIS AND PROCESS FOR REFORMING HYDROCARBONS

Harrison M. Stine, East Cleveland, Ohio, assignor, by mesne assignments, to Socony-Vacuum Oil Company, Incorporated, a corporation of New York No Drawing. Application August 11, 1948, Serial No. 43,764

6 Claims. (Cl. 260—668)

This invention relates to the catalytic conversion of hydrocarbon mixtures by increasing the aromatic and/or olefinic content of said mixture thereby rendering said mixture more suitable for use in motor fuels or the like. The invention also relates to a novel catalyst suitable for use in the conversion process, and to the method of making the catalyst.

The invention has among its objects the provision of a catalyst having as its active constituent a novel composition of matter comprising a mixture of aluminum, iron and beryllium oxides in a particular form, said catalyst having improved reforming properties; the provision of a method of making the catalyst; and a method of reforming hydrocarbons with the catalyst. Other objects will be apparent from the following description.

The novel catalyst of the invention comprises as its essential and active components the oxides of iron, beryllium and aluminum. When this mixture is heated to a temperature of 1150° F. or higher, a change of structure indicative of the formation of a new composition of matter takes place and this change of structure is accompanied by a marked enhancing of the catalytic properties of the mixture.

The hydrocarbons to be treated may be of any desired non-benzenoid character usually subjected to reforming, although the preferred stock for treatment is a light naphtha. The desired conversion is carried out by passing the hydrocarbon mixture through a catalyst bed maintained at between 750° F. and 1100° F. at the rate of 0.1 to 10 volumes of liquid stock per volume of catalyst per hour. Although the operation is successful at atmospheric pressure when no additional gases are introduced into the reaction zone, gauge pressures of as high as 400 pounds per square inch may be employed, and hydrogen may be fed into the catalyst zone (hydroforming) as is often done to inhibit coke formation. When off-gas from the process containing hydrogen and butane hydrocarbons is recycled through the catalyst bed at temperatures near the upper limit of the preferred range, pressures up to 800 pounds per square inch may be employed. The expression "reforming" is used as generic to a process with or without the feeding of hydrogen or other gases.

As an example: A catalyst having the desired reforming characteristics was prepared in the following manner: Two mols of Be(NO$_3$)$_2$ and two mols of Fe(NO$_3$)$_3$ were dissolved in 8 liters of water containing 10 mols of nitric acid as 16 normal acid. To this mixture was added 16 mols of NaAlO$_2$. The resulting solution was then neutralized by the addition of 250 cc. of 8 N nitric acid. This neutralization caused the co-precipitation of aluminum, iron and beryllium hydroxides in the molal ratio of, 80 Al, 10 Fe and 10 Be. The slurry was stirred for one hour, filtered, washed with 40 liters of tap water and 30 liters of distilled water, and then dried at 150° F. for 12 hours. The mixture of hydroxides is completely converted to the corresponding oxides of the particular form which comprises the invention by maintaining it at a temperature of 1250° F. for 10 hours.

This heating is an important step in the preparation of the preferred type of catalyst because at this temperature, the constituent oxides form a composition of matter which is probably a compound or pseudo-compound of the spinel type, that is, a mixed aluminate of iron and beryllium. Although the exact nature of this composition of matter has not been determined, its presence is indicated by X-ray analysis of a sample of the catalyst. When examined by X-rays from a molybdenum target using a wave-length of 0.7103 kx units, the sample of catalyst yielded a pattern which in addition to the pattern normally obtained from such a mixture, contained a line having an inter-atomic spacing of 4.51 kx units and of weak relative intensity, a second characteristic line having an inter-atomic spacing of 3.21 kx units and of medium relative intensity, and a third characteristic line having an inter-atomic spacing of 1.51 kx units of weak relative intensity. A catalyst prepared in exactly the same manner as the above-described catalyst except that it was heated for 10 hours at a temperature of 1050° F. instead of 1250° F. failed to yield the three characteristic lines mentioned above when subjected to the same type of X-ray analysis. As will be pointed out later, the appearance of these characteristic lines in the X-ray diffraction pattern corresponds to a marked increase in the catalytic activity of the oxide composition which indicates the formation of a new and especially active catalytic substance.

The catalyst made in the above-described manner is used to treat 57° A. P. I. naphtha having no appreciable amount of olefins and 8% of aromatics. The treatment was carried out at atmospheric pressure and at a temperature of 950° F. The stock was passed through the catalyst bed at a rate of 1.0 volume of liquid stock per volume of catalyst per hour. No off-gases were recycled and no additional hydrogen was introduced into the system. After this treatment the naphtha was found to have an aromatic content of 28% and an olefin content of 12%. Using a catalyst prepared in the same way but heated to a temperature of only 1050° F. rather than 1250° F. with naphtha stock of identical composition under the same conditions of temperature, pressure, etc., the reformed product contained only 22% aromatics and 10% olefins.

Catalysts formed from 20 mol per cent iron oxide and 80 mol per cent aluminum oxide heated to 1050° and 1250° F., and catalysts formed from 20 mol per cent beryllium oxide and 80 mol per cent aluminum oxide heated to 1050° and 1250° F., were tested under identical conditions and gave inferior reforming results as measured by the aromatic and olefin content. Mixtures of the above catalysts gave still poorer results.

Thus it can be seen that by raising the temperature at which the three component catalyst is activated to above 1050° F., a marked increase in its reforming potency corresponding to the formation of a new composition of matter takes place. Therefore, it appears that the increase in catalytic activity is due to the formation of a new and very active compound or crystalline phase. While the preferred temperature of activation of the aluminum oxide-beryllium oxide-iron oxide mixture for the production of this crystalline phase is 1250° F., it is possible to produce it at any temperature between 1150° F. and 1500° F., preferably above 1200° F. It is to be noted that the temperature employed in making the catalyst is above the temperature usually used in reforming processes.

Although a number of catalysts that are commonly used to increase the aromatic content of hydrocarbon mixtures are also effective as cracking catalysts, it has been found that the composition of matter formed by heating the mixture of oxides as described above inhibits cracking rather than catalyzing the reaction positively. Thus a catalyst of the type described that has been activated at a temperature of 1250° F. was found to have a lower catalytic cracking power than a sample that had been activated at 1050° F.

Although the preferred type of catalyst is a composition of co-precipitated iron, beryllium and aluminum oxides, or iron and beryllium oxides supported by aluminum oxide, it is possible to prepare the constituent oxides separately in any conventional manner and then mix them in the desired proportions, and after heating to the requisite temperature, the resulting mixture may be used as a catalyst in any usual reforming conditions.

The proportions of the oxides may be varied, and improved results are obtained as long as all three oxides are present in appreciable amounts, preferably in a ratio of 2.5-20 mol per cent beryllium oxide, 5-20 mol per cent ferric oxide and 60-92.5 mol per cent aluminum oxide.

It should be understood that although the use of the preferred catalyst has been described in connection with a reforming process in which no hydrogen or off-gases are recycled through the catalyst zone, the catalyst may be employed in those variations of the hydrocarbon reforming process in which such gases are circulated (hydroforming) and that variations of temperature, pressure, rate of flow of hydrocarbon stock, etc. may be made according to the peculiar requirements of the reforming method to be employed.

The catalyst may be any type of fixed or movable bed or it may be fluidized.

I am aware that dehydrogenation catalysts have been proposed heretofore in which beryllium oxide is used as a support and minor amounts of other materials, such as iron oxide, copper oxide, and potassium oxide have been used as promoters. Such a catalyst, however, radically differs from mine in composition and in use since the dehydrogenation accomplished with such prior art catalysts, such as conversion of butenes to butadiene, is accomplished at a much higher temperature than the treatment in accordance with my invention in which the stocks comprise for the most part aliphatic compounds having six or more carbon atoms.

It will further be understood that numerous other variations obvious to those skilled in the art may be employed without departing from the spirit of the invention as defined in the following claims.

I claim:

1. A method of producing a reforming catalyst, said method comprising co-precipitating the hydroxides of aluminum, beryllium and iron, converting the resulting mixture into the corresponding oxides, and maintaining said mixture of oxides at a temperature of at least 1150° F., the said mixture of oxides consisting of beryllium, ferric and aluminum oxides in the ratio of approximately 10 mol percent beryllium oxide, 10 mol percent ferric oxide and 80 mol percent aluminum oxide.

2. A method of producing a reforming catalyst, said method comprising maintaining a mixture consisting of beryllium, ferric and aluminum oxides in the ratio of approximately 10 mol percent beryllium oxide, 10 mol percent ferric oxide and 80 mol percent aluminum oxide at a temperature of about 1250° F.

3. A reforming catalyst consisting of beryllium, ferric and aluminum oxides in the ratio of about 10 mol percent beryllium oxide, about 10 mol percent ferric oxide and about 80 mol percent aluminum oxide in the form which results from heating a mixture of said oxides to a temperature within the approximate range of 1150 to 1500° F.

4. A reforming catalyst consisting of beryllium, ferric and aluminum oxides in the ratio of about 10 mol percent beryllium oxide, about 10 mol percent ferric oxide and about 80 mol percent aluminum oxide in the form which results from heating a mixture of said oxides to a temperature of about 1250° F.

5. A process for increasing the content of aromatics and unsaturates in a hydrocarbon mixture, said process comprising contacting said hydrocarbon mixture with the catalyst of claim 3 under reforming conditions.

6. A process for increasing the content of aromatics and unsaturates in a hydrocarbon mixture, said process comprising contacting said hydrocarbon mixture with the catalyst of claim 4 under reforming conditions.

HARRISON M. STINE.

REFERENCES CITED

The following references are of record in the file of this patent:

UNITED STATES PATENTS

| Number | Name | Date |
|---|---|---|
| 2,292,570 | Klemm et al. | Aug. 11, 1942 |
| 2,348,557 | Mattox | May 9, 1944 |
| 2,348,624 | Hillman | May 9, 1944 |
| 2,418,888 | Kearby | Apr. 15, 1947 |
| 2,426,118 | Parker et al. | Aug. 19, 1947 |
| 2,449,295 | Gutzeit | Sept. 14, 1948 |
| 2,450,176 | Zschiegner | Sept. 28, 1948 |